United States Patent
Yu et al.

(10) Patent No.: US 7,573,218 B2
(45) Date of Patent: Aug. 11, 2009

(54) SENSORLESS DRIVING METHOD FOR BRUSHLESS DC MOTOR

(75) Inventors: Hsing-Cheng Yu, Hsinchu County (TW); Hsing-Yu Lin, Taichung County (TW); Shir-Kuan Lin, Hsinchu (TW); Shyh-Jier Wang, Hsinchu County (TW)

(73) Assignee: Industrial Technology Research Institute, Hsinchu (TW)

( * ) Notice: Subject to any disclaimer, the term of this patent is extended or adjusted under 35 U.S.C. 154(b) by 186 days.

(21) Appl. No.: 11/738,527

(22) Filed: Apr. 23, 2007

(65) Prior Publication Data

US 2008/0252241 A1    Oct. 16, 2008

(30) Foreign Application Priority Data

Feb. 13, 2007    (TW) .............................. 96105243 A

(51) Int. Cl.
*H02P 6/00*    (2006.01)
(52) U.S. Cl. ............................ 318/400.25; 318/400.13; 318/400.24; 318/254
(58) Field of Classification Search ................ 318/700, 318/400.1, 400.13, 400.24, 400.25, 400.32–400.36, 318/254, 439, 138
See application file for complete search history.

(56) References Cited

U.S. PATENT DOCUMENTS

| | | | | |
|---|---|---|---|---|
| 5,294,877 A | * | 3/1994 | Cameron | 318/809 |
| 5,517,095 A | * | 5/1996 | Carobolante et al. | 318/400.35 |
| 5,616,996 A | * | 4/1997 | Tang et al. | 318/400.13 |
| 5,886,486 A | | 3/1999 | Jeong et al. | |
| 5,929,577 A | * | 7/1999 | Neidorff et al. | 318/400.35 |
| 6,111,372 A | * | 8/2000 | Nishimura | 318/400.34 |
| 6,249,096 B1 | * | 6/2001 | Shin | 318/400.06 |
| 6,420,847 B1 | * | 7/2002 | Galbiati et al. | 318/727 |
| 6,901,212 B2 | * | 5/2005 | Masino | 318/400.35 |
| 6,979,970 B2 | * | 12/2005 | Iwanaga et al. | 318/400.35 |

FOREIGN PATENT DOCUMENTS

TW    591882    6/2004

* cited by examiner

*Primary Examiner*—Bentsu Ro
*Assistant Examiner*—Thai Dinh
(74) *Attorney, Agent, or Firm*—Jianq Chyun IP Office

(57) ABSTRACT

A sensorless driving method for a brushless DC motor is provided. The time for the motor to rotate an electrical angle 60° is obtained by alternatively counting the occurrences of zero crossings with two counters and comparing the counted values, and the motor is delayed an electrical angle of 30°, by which a precise commutating time is obtained. The driving method provides a mask-based phase shift digital detection mechanism for effectively detecting true zero-crossing points. The driving method further provides an inhabitation mechanism with the function of soft-switch for inhibiting noise caused by transistor switching. By using these two counters, the time for the motor to rotate two electrical angles 30°−Δθ and 30°+Δθ are obtained and stored in two registers. The time period before and after the commutating point is added into a pulse width modulation (PWM) signal to reduce the noise and vibration.

5 Claims, 7 Drawing Sheets

SENSORLESS DRIVING METHOD FOR BRUSHLESS DC MOTOR

CROSS-REFERENCE TO RELATED APPLICATION

This application claims the priority benefit of Taiwan application serial no. 96105243, filed Feb. 13, 2007. All disclosure of the Taiwan application is incorporated herein by reference.

BACKGROUND OF THE INVENTION

1. Field of the Invention

The present invention generally relates to a sensorless driving method for a brushless DC motor, in particular, to a sensorless driving method which achieves low noise by using the terminal voltage and central phase voltage of a motor.

2. Description of Related Art

A position sensor (for example, a Hall device) in a brushless DC motor is used for replacing the commutation structure (for example, a commutator and a carbon brush) in a conventional brush DC motor, therefore the brushless DC motor has such advantages as low noise, long life, and small volume etc. Besides, brushless DC motor has high rotating speed and requires no maintenance because no commutator or carbon brush is used; therefore brushless DC motor has replaced brush DC motor in automatic servo control systems. Moreover, brushless DC motor is a very good driving apparatus regarding its control performance and stability, thus, brushless DC motors are broadly applied to both industrial fields and household appliances. Furthermore, brushless DC motor plays a very important role in post PC era when it is applied to information appliances such as CD-ROM and DVD player etc.

In most existing driving methods for a brushless DC motor, a sensor (for example, a Hall device, an optical encoder, or a revolver) is usually used for detecting the position of a motor rotor, and a driver can only output suitable commutating signals for driving the brushless DC motor appropriately with such a position sensor installed. The performance of commutating control will directly affect the performance of close-loop position control and speed control. Therefore, to increase the resolution of the sensor and the accuracy of commutating control, both the volume and cost of the system with the sensor installed are increased.

The design of motor is going towards miniaturization, high precision, and low noise inevitably, and the space taken by the position sensor has become a major obstacle for reducing the volume of the motor. In addition, a position sensor is sensitive to temperature and noise and has life problem, which reduces the reliability of the sensor and the commutating control, and accordingly restricts the application of the motor relatively.

Accordingly, by using a sensorless driving technique, the time and effort for locating the accurate position of a sensor can be saved, and based on various restrictions of a sensor described above, sensorless driving technique is a very promising driving technique.

A digital phase shifter is disclosed in ROC Patent NO. 591882. According to this disclosure, the phase shifter includes two counters identically greater than 0, and these two counters are used for estimating the phase delay time that a motor rotates an electrical angle of 30°. The theory thereof will be described below. First, a first and a second counter are respectively defined as a positive/negative edge triggered counter, and the increment and decrement thereof are respectively $r_i$ and $r_d$. When a positive edge of the induced electromotive force occurs (the voltage level thereof is changed from negative to positive), the first counter increases by $r_i$ until a negative edge of the induced electromotive force occurs (the voltage level thereof is changed from positive to negative), and here the value counted by the first counter is the time required for the motor to rotate an electrical angle of 60°. Accordingly, the time for the motor to rotate an electrical angle of 30° can be delayed by only changing the count-down rate of the first counter to two times of $r_i$ (i.e. $r_d=2r_i$) when a negative edge of the induced electromotive force occurs, and it is the actual commutating point when the first counter counts down to zero. The working theory thereof while a negative edge of the induced electromotive force occurs is similar except that it is accomplished by the second counter.

A digital phase shifter which achieves 90° phase delay is disclosed in U.S. Pat. No. 5,886,486. The phase shifter in this disclosure includes six counters $P_a$, $N_a$, $P_b$, $N_b$, $P_c$, and $N_c$. First, signals $S_a$, $S_b$, and $S_c$ are respectively defined as the output signal after comparing three phase terminal voltages with central phase voltage. $P_a$, $P_b$, and $P_c$ respectively count the time while the signals $S_a$, $S_b$, and $S_c$ being logic high, and $N_a$, $N_b$, and $N_c$ respectively count the time while the signals $S_a$, $S_b$, and $S_c$ being logic low. Each counter counts the time for the motor to rotate an electrical angle of 180°. If the counter $N_a$ is used for counting the time while the signal $S_a$ being high voltage level when the signal $S_a$ is changed from high voltage level to low voltage level (a zero-crossover of the induced electromotive force occurs), when the counter $N_a$ counts to half of the value of counter $P_a$, which means the motor has rotated an electrical angle of 90°, a phase shifting signal is output, the counter $P_a$ is reset to zero, and the counter $N_a$ continues to count. If the counter $P_a$ is used for counting when the signal $S_a$ changes from low voltage level to high voltage level, a commutating signal is output and the counter $N_a$ is reset to zero when the counter $P_a$ counts to half of the value of counter $N_a$. The counters $P_b$, $N_b$, $P_c$, and $N_c$ perform similar operations, and accordingly, six commutating signals for a six-step square wave can be estimated by using the six counters.

SUMMARY OF THE INVENTION

Accordingly, the present invention is directed to a sensorless driving method for a brushless DC motor, wherein no sensor and low noise are achieved by using the terminal voltage and central phase voltage of the motor.

The present invention provides a sensorless driving method for a brushless DC motor, wherein the three-phase brushless DC motor is driven without a sensor, and electronic noise caused by phase shifts is reduced through soft-switch.

According to the present invention, the sensorless driving method for a brushless DC motor includes using a mask-based phase shift digital detection mechanism for detecting zero-crossing and using an inhibition mechanism for inhibiting electronic noise caused by transistor switching.

According to foregoing mask-based phase shift digital detection mechanism, a first and a second counter are used for calculating a commutating point of the brushless DC motor, wherein when the first zero-crossing occurs, the first counter is used for counting from zero until the next zero-crossing occurs. Then the second counter is used for counting from zero, while the value of the first counter is divided by 2 and the result is stored in the first counter. Foregoing steps are performed repeatedly. It is a commutating point when the value counted by the second counter reaches the value stored in the first counter; similarly, it is another phase shifting point when the value counted by the first counter reaches the value stored in the second counter.

Foregoing inhabitation mechanism for inhibiting electronic noise caused by transistor switching is a soft-switch method for reducing noise caused by transistor switching while the motor commutating. The soft-switch method is to reduce the pulse width modulation (PWM) duty cycle within an electrical angle $\Delta\theta$ before and after a commutating point, so as to reduce voltages of the brushless DC motor coils.

According to foregoing soft-switch method for reducing noise, two registers are used for detecting whether the electrical angle is within $\Delta\theta$ before and after a commutating point, wherein the first register is used for recording the position of the electrical angle $\Delta\theta$ before the commutating point, and the second register is used for recording the position of the electrical angle $\Delta\theta$ after the commutating point. When the second counter starts to count, the content of the first register is the value stored in the first counter minus the result of the stored value divided by 30 (the stored value/30 is $\Delta\theta$), and the content of the second register is the value stored in the first counter plus the result of the stored value divided by 30 (the stored value/30 is $\Delta\theta$). While when the first counter starts to count, the contents of the first and the second registers are calculated with the value stored in the second counter.

According to foregoing soft-switch method for reducing noise, whether the electrical angle is within $\Delta\theta$ before and after a commutating point is detected by comparing values counted by the counters and values stored in the registers. The PWM duty cycle is reduced if the value counted by the counter reaches the value in the first register, and the original PWM duty cycle is restored when the value counted by the counter reaches the value in the second register.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

DESCRIPTION OF THE EMBODIMENTS

Figure 1:
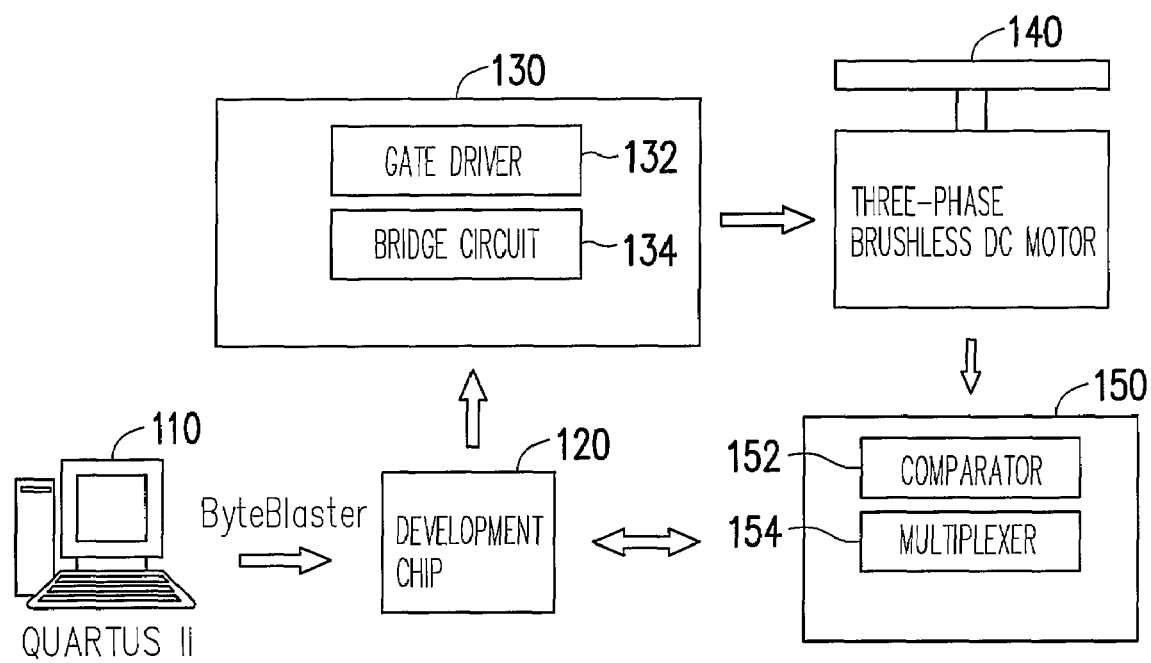
FIG. 1 is a diagram illustrating the hardware architecture of a sensorless three-phase brushless DC motor according to an exemplary embodiment of the present invention.

Reference will now be made in detail to the present preferred embodiments of the invention, examples of which are illustrated in the accompanying drawings. Wherever possible, the same reference numbers are used in the drawings and the description to refer to the same or like parts.

The present invention provides a sensorless driving method for a brushless DC motor, wherein the purpose of no sensor and low noise is achieved by using the terminal voltages and central phase voltage of the motor. The present invention also provides a method for driving a three-phase brushless DC motor without a sensor, and soft-switch is adopted in this method for reducing electronic noises caused by phase shifts.

According to the sensorless driving method for a brushless DC motor provided by the present invention, a mask-based phase shift digital detection mechanism and an inhabitation mechanism for inhibiting electronic noises caused by transistor switching are adopted.

According to the mask-based phase shift digital detection mechanism, two counters are used for calculating the commutating points of a motor. The two counters are denoted as $C_p$ and $C_n$ in following description. When first zero-crossing occurs, the first counter starts counting from zero, and it stops counting when the next zero-crossing occurs. Then the second counter starts to count, while the value counted by the first counter is divided by 2 and the result is stored in the first counter. Foregoing steps are performed repeatedly. It is a commutating point when the value counted by the second counter reaches the value stored in the first counter, and similarly, it is another commutating point when the value counted by the first counter reaches the value stored in the second counter.

The inhabitation mechanism for inhibiting electronic noises caused by transistor switching is a soft-switch method for reducing noises caused by transistor switching while the motor commutating. The soft-switch method is to reduce the pulse width modulation (PWM) duty cycle, for example, to or below 20%, within an electrical angle $\Delta\theta$ before and after a commutating point, so as to reduce voltages of the brushless DC motor coils. Two registers are used for detecting whether the electrical angle is within $\Delta\theta$ before and after a commutating point, wherein the first register is used for recording the position of the electrical angle $\Delta\theta$ before the commutating point, and the second register is used for recording the position of the electrical angle $\Delta\theta$ after the commutating point. When the second counter starts to count, the content of the first register is the value stored in the first counter minus the result of the stored value divided by 30 (the stored value/30 is $\Delta\theta$), and the content of the second register is the value stored in the first counter plus the result of the stored value divided by 30 (the stored value/30 is $\Delta\theta$). While when the first counter starts to count, the contents of the first and the second registers are calculated with the value stored in the second counter.

Whether the electrical angle is within $\Delta\theta$ before and after a commutating point is detected by comparing values counted by the counters and values stored in the registers. The PWM duty cycle is reduced if the value counted by the counter reaches the value in the first register, and the original PWM duty cycle (a full cycle or a cycle controlled by a speed controller) is restored when the value counted by the counter reaches the value in the second register.

FIG. 1 is a diagram illustrating the hardware architecture of a sensorless three-phase brushless DC motor according to an exemplary embodiment of the present invention, wherein the core of control is the field programmable gate array (FPGA) in the Nios development kit. A hardware description language (HDL) for required function and specification is written in a personal computer (PC) 110 using the software Quartus II developed by Altera, and the HDL is downloaded into a development chip 120 through a ByteBlaster connected to the parallel port of the PC 110. A control signal produced by the output port of the chip 120 is used for driving a three-phase brushless DC motor 140 through a motor driven peripheral circuit 130. The input port of the chip 120 reads comparison information between three-phase voltages and a central phase voltage of the three-phase brushless DC motor 140 through a voltage detection circuit 150 to establish a sensorless driving system for the three-phase brushless DC motor. The motor driven peripheral circuit 130 includes a gate driver 132 and a six-bridge circuit 134. The voltage detection circuit 150 includes a comparator 152 and a multiplexer 154.

Figure 2A:
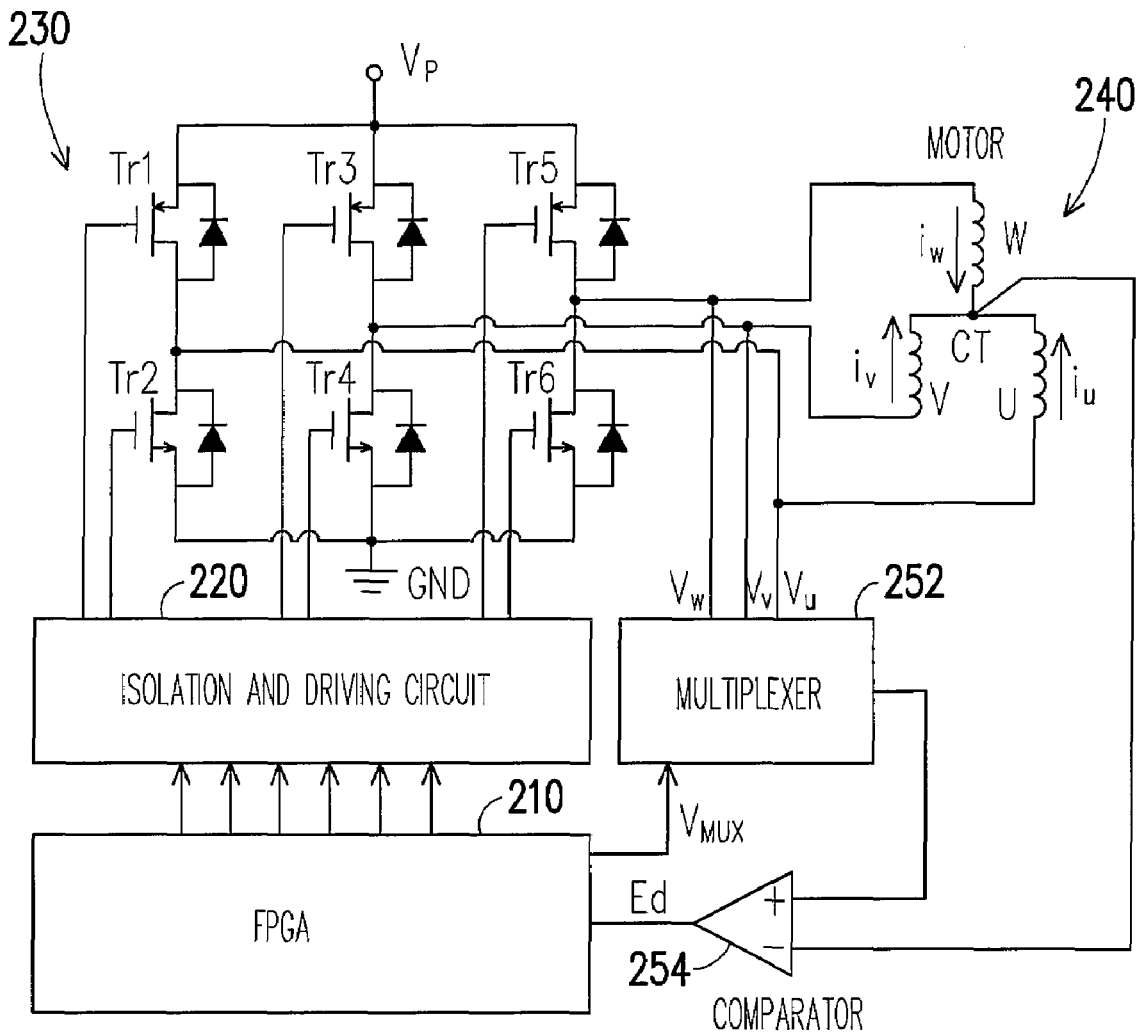
FIG. 2A is a diagram illustrating an actual implementation of the sensorless three-phase brushless DC motor in FIG. 1.

FIG. 2A is a diagram illustrating an actual implementation of the sensorless three-phase brushless DC motor in FIG. 1. A control signal produced by the output port of a FPGA 210 is connected to a six-bridge circuit 230 through an isolation and driving circuit 220, wherein the bridge circuit 230 is composed of six power transistors Tr1, Tr2, Tr3, Tr4, Tr5, and Tr6 and six freewheeling diodes. By controlling the on and off of the six power transistors Tr1~Tr6, the coil U, V, W of a three-phase brushless DC motor 240 can be controlled to be connected to an operating voltage $V_P$, grounded, or open.

A multiplexer 252 is connected to three-phase terminal voltages $V_U$, $V_V$, and $V_W$ of the three-phase brushless DC motor 240. An inactive phase voltage is selected through the control voltage $V_{MUX}$ of the FPGA 210 and outputted to an input terminal of the comparator 254. Another input of the comparator 254 is the central phase (as the CT in FIG. 2A) voltage from the three-phase brushless DC motor 240, and a feedback signal Ed is obtained and inputted to the FPGA 210.

Figure 2B:
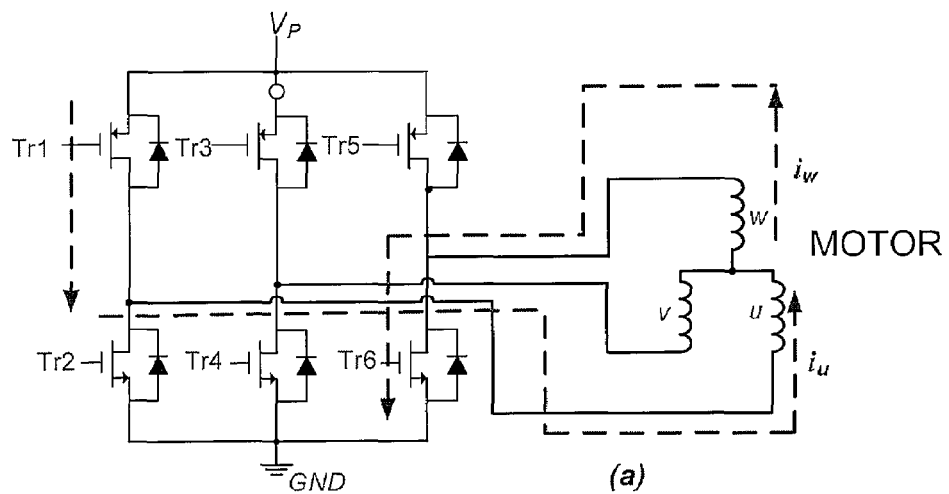
FIG. 2B is a diagram illustrating that switching noises may affect the detection of zero-crossings of an induced electromotive force.
Figure 2B:
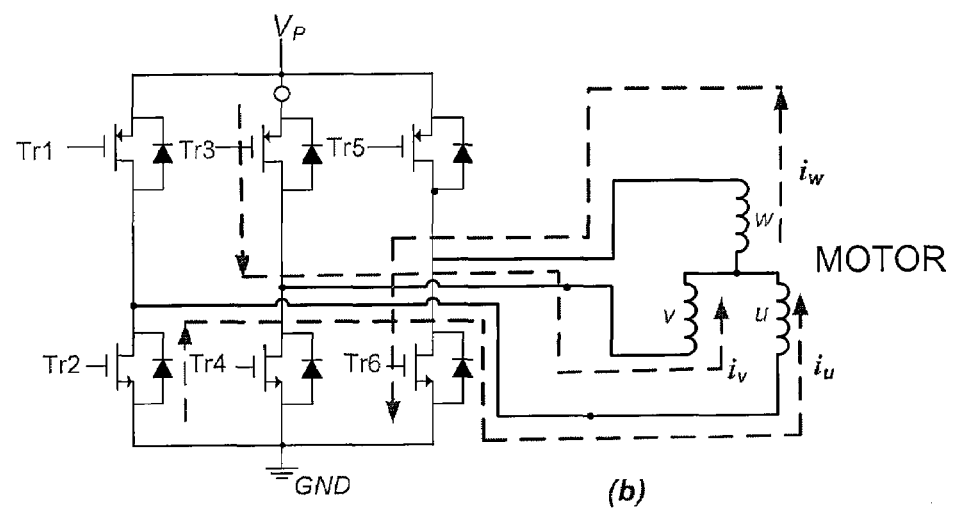
Figure 2B:
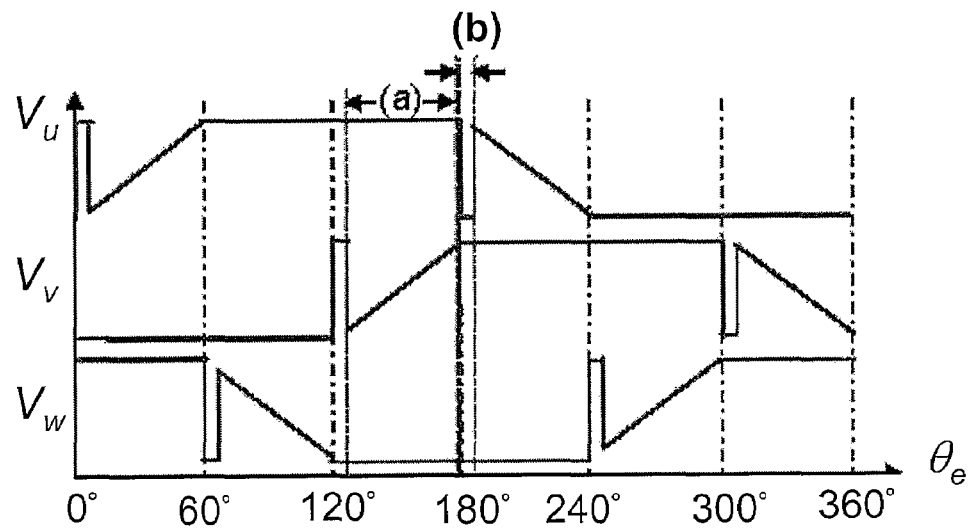

Since switching noise may affect the detection of zero-crossings of an induced electromotive force, a masked phase shifting method or a masking circuit is required for preventing such affections. Accordingly, a driving method for a brushless DC motor with a mask-based phase shift digital detection mechanism is provided in the present invention. When the switching noises are mostly produced by freewheeling diode effect, the current direction is switched from direction u→w to direction v→w, as illustrated in FIG. 2B. During period (a), the current direction is from phase u to phase w of the motor. At the instance when the motor changes the current from phase v to phase w, namely, at the instance when the transistor Tr1 of the upper bridge of phase u is off and the transistor Tr3 of the upper bridge of phase v is on, the current passes through the freewheeling diode of the lower bridge of phase u. Therefore during period (b), $V_u$ is reduced to a logic low level instantaneously and stays there until the current of phase u disappears. The freewheeling effect is produced after every commutation, therefore the problem of switching noise has to be considered after every commutation to allow the motor to rotate properly.

According to equal-step or four-step linear estimation method, theoretically, zero-crossings of an induced electromotive force are detected and then the motor is delayed an electrical angle of 30° so that the optimal commutating point is obtained; however, actually because of the affection of freewheeling diode effect, switching noise is produced after every phase shift, so that false zero-crossings of the induced electromotive force are produced, and accordingly the equal-step or four-step linear estimation method becomes impossible to be implemented. Thus, to prevent switching noises from affecting the detection of commutating points, two counters $C_p$ and $C_n$ of the digital phase shifter are revised in an embodiment of the present invention.

Figure 2C:
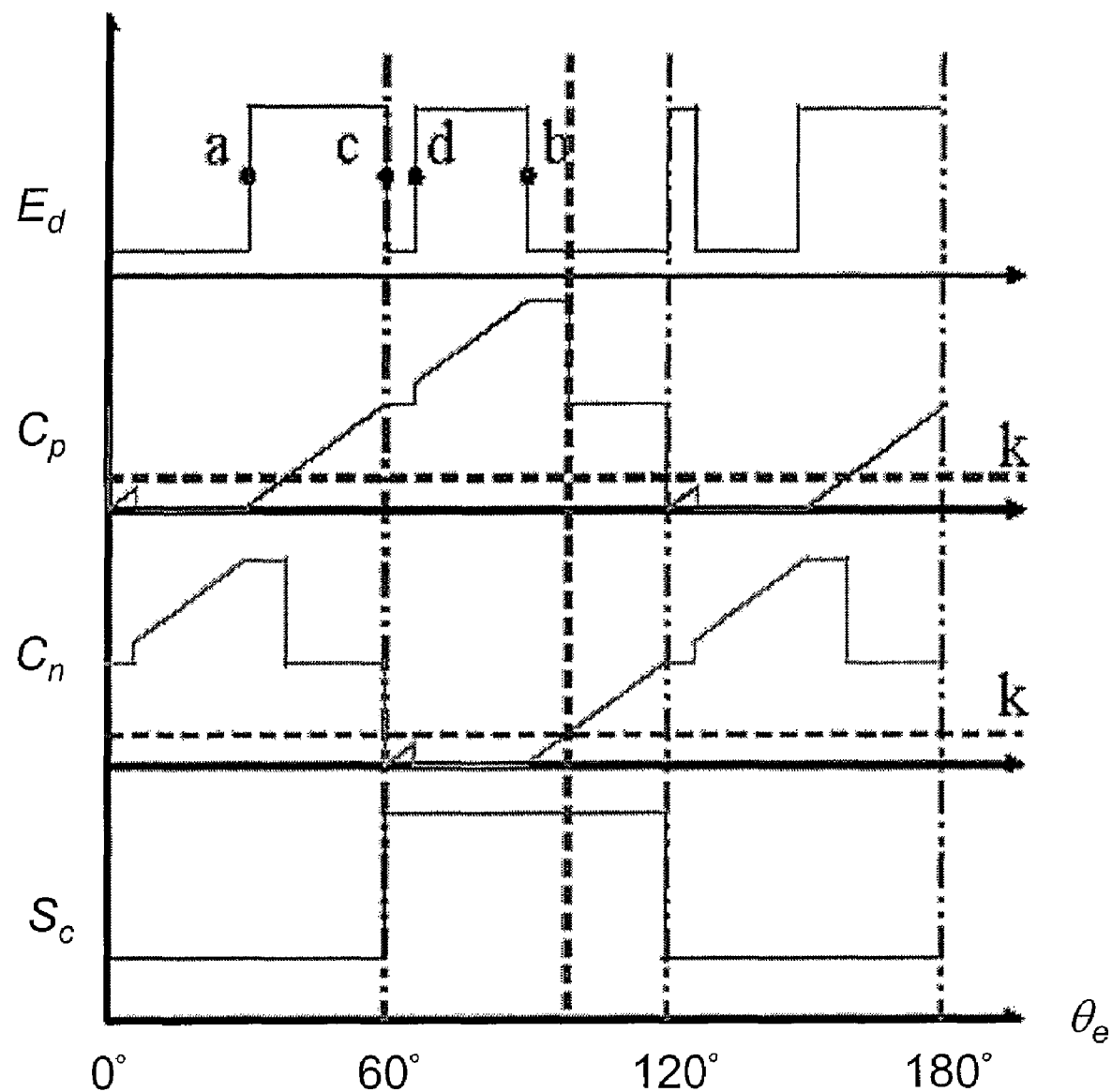
FIG. 2C is a timing diagram of an operation signal of a digital phase shifter having masking function according to an embodiment of the present invention.

FIG. 2C is a timing diagram of an operation signal of a digital phase shifter having masking function according to an embodiment of the present invention, wherein $E_d$ is a digital signal obtained by comparing the inactive phase voltage and central phase voltage, $C_p$ and $C_n$ are counters respectively counting the time of the digital signal $E_d$ being at logic high level and logic low level. $S_c$ is a commutating signal, and a change in the level of $S_c$ denotes a commutating action. $\theta_e$ is the electrical angle of the motor rotor. Zero-cross of $E_d$ occurs after every commutation due to freewheeling diode effect, and to prevent the affection of false zero-crossings, a masking time value k is set to the counters $C_p$ and $C_n$. It is considered as a real zero-crossing only if the values counted by the counters $C_p$ and $C_n$ reach the masking time value k, and then equal-step of four-step linear estimation is performed and the motor is delayed an electrical angle of 30°; otherwise, it is considered as a false zero-crossing, and here the counted values are accumulated to the counter which counts the electrical angle of the motor to 60°, and such a process is performed until the value counted by the counter $C_p$ or $C_n$ reaches the masking time value k (a real zero-crossing occurs).

The operation of a digital phase shifter with masking function will be described below. Assuming the current electrical angle of the rotor is 60°, the counter $C_p$ starts to count the time when $E_d$ being logic high level from the change point a of $E_d$. A change point c of $E_d$ is produced due to freewheeling diode effect, and here the counter $C_p$ stops counting and the counter $C_n$ starts to count. It is considered as a false zero-crossing since a change point d is produced before the value counted by the counter $C_n$ reaches the masking time value k, and since the value counted by the counter $C_n$ is still within the time for the motor to rotate an electrical angle of 60°, the value of counter $C_n$ is accumulated to the value of counter $C_p$, and the counter $C_n$ is reset to zero. Next, the counter $C_p$ continues to count until a change point b of $E_d$ is produced, here the counter $C_p$ stops counting and the counter $C_n$ starts to count. When the value counted by the counter $C_n$ reaches the masking time value k, an equal-step of four-step linear estimation is performed to the counter $C_p$, and the counter $C_n$ continues to count until the value counted by the counter $C_n$ is the same as the value of the counter $C_p$. A commutating signal is then output, and the counter $C_p$ is reset to zero (if the four-step linear estimation method is used then the register has to be updated). Accordingly, the equal-step or four-step linear estimation method can be applied to the present invention.

Figure 3:
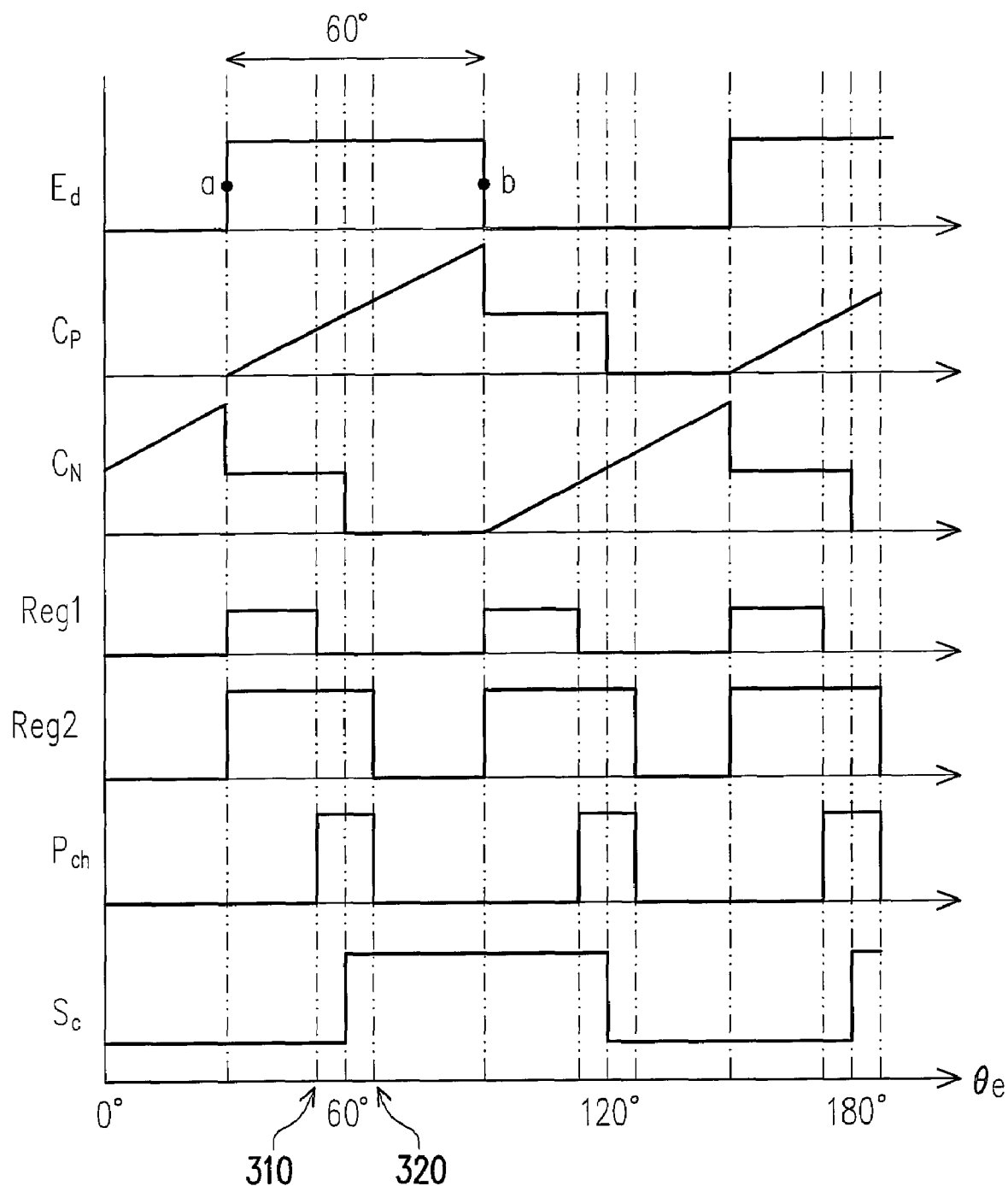
FIG. 3 is a timing diagram of an operation signal of a digital phase shifter with soft-switch according to another embodiment of the present invention.

FIG. 3 is a timing diagram of an operation signal of a digital phase shifter with soft-switch according to another embodiment of the present invention. $E_d$ is a digital signal obtained by comparing an inactive phase voltage and a central phase voltage $V_{CT}$. $C_p$ and $C_n$ are two counters respectively counting the time of the digital signal $E_d$ being logic high level and logic low level, and the counters do not have to count simultaneously. $S_c$ is a commutating signal, and a change in the level of $S_c$ denotes a commutating action. Reg1 and Reg2 are two registers for storing a particular angle before and after a commutating point. $P_{ch}$ is a duty cycle change signal, wherein when the duty cycle change signal is at logic high level within a particular angle before and after a commutating point, the duty cycle of a pulse width modulation (PWM) signal is changed. $\theta_e$ is an electrical angle of the motor rotor.

The inhabitation mechanism for inhibiting electronic noises caused by transistor switching is a soft-switch method for reducing noises caused by transistor switching while the motor changes phases. According to the soft-switch method, the duty cycle of PWM is reduced, for example, to or below 20%, within an electrical angle $\Delta\theta$ before and after a commutating point in order to reduce the voltages of motor coils. The method for detecting the electrical angle $\Delta\theta$ before and after the commutating point $S_c$ is to use two registers Reg1 and Reg2, one for recording the position of the electrical angle $\Delta\theta$ before the commutating point $S_c$, and the other is for recording the position of the electrical angle $\Delta\theta$ after the commutating point $S_c$, as positions 310 and 320 in FIG. 3.

When the second counter starts to count, the content of the first register is the value stored in the first counter minus the result of the stored value divided by 30 (the stored value/30 is $\Delta\theta$), and the content of the second register is the value stored in the first counter plus the result of the stored value divided by 30 (the stored value/30 is $\Delta\theta$). While when the first counter starts to count, the contents of the first and the second register are calculated with the value stored in the second counter.

Whether an electrical angle is within $\Delta\theta$ before and after a commutating point is detected by comparing the values counted by two counters and the values stored in two registers. If the value counted by a counter reaches the value stored in the first register, the PWM duty cycle is reduced, and the original PWM duty cycle is restored when the value counted by the counter reaches the value in the second register (full cycle or a cycle controlled by a speed controller).

Figure 4:
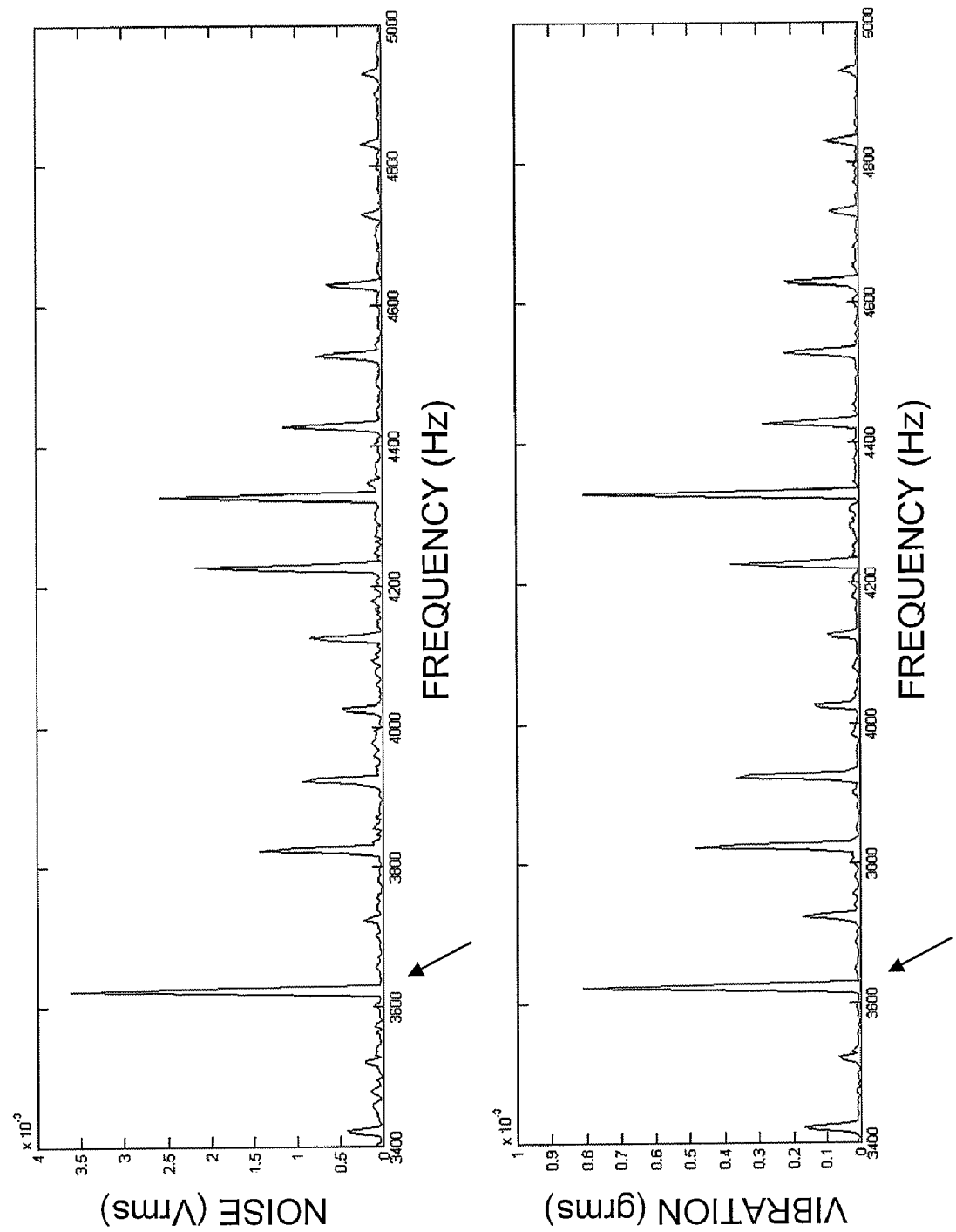
FIG. 4 illustrates the spectrums of noise and vibration produced by a CD-ROM motor driven by a 5V voltage source.
Figure 5:
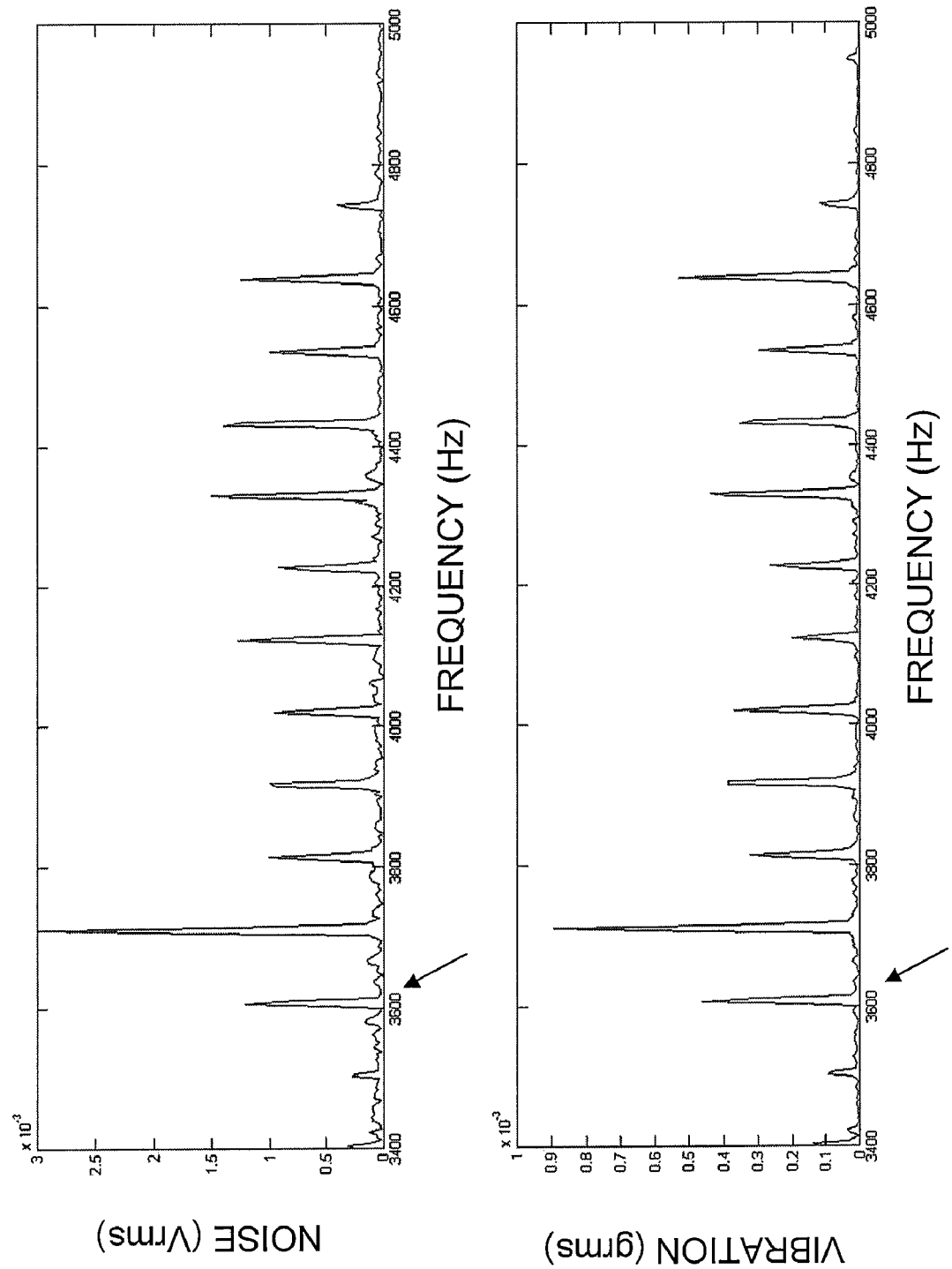
FIG. 5 illustrates the spectrums of noise and vibration produced by a CD-ROM motor which has a digital phase shifter provided by the present invention and is driven by a 5V voltage source.

FIG. 4 illustrates the spectrums of noise and vibration produced by a CD-ROM motor driven by a 5V voltage source. The electronic noise produced by transistor switching is 36 times of the rotation speed of the motor (i.e. the part in FIG. 4 with frequency at about 3.6 kHz). As shown in FIG. 4, the value of the noise is about $3.5\times10^3$ Vrms. FIG. 5 illustrates the spectrums of noise and vibration produced by a CD-ROM motor which is driven by a 5V voltage source and has a digital phase shifter with soft-switch provided by the present invention. The voltage is changed to maintain the frequency of the electronic noise, namely, at the part where the frequency is about 3.6 kHz in the figure, the noise is about $3\times10^3$ Vrms. Accordingly, the electronic noise produced by transistor switching is reduced with soft-switch mechanism.

It will be apparent to those skilled in the art that various modifications and variations can be made to the structure of the present invention without departing from the scope or spirit of the invention. In view of the foregoing, it is intended that the present invention cover modifications and variations of this invention provided they fall within the scope of the following claims and their equivalents.

What is claimed is:

1. A sensorless driving method for a brushless DC motor, the method comprising:
    detecting zero-crossings by a mask-based phase shift digital detection mechanism for detecting zero-crossings; and
    inhibiting electronic noises caused by transistor switching by an inhibition mechanism;
    wherein a first counter and a second counter included in the mask-based phase shift digital detection mechanism are used for calculating commutating points of the brushless DC motor, wherein when a first zero-crossing occurs, the first counter starts to count until a next zero-crossing occurs; and then the second counter starts to count, while a value counted by the first counter is divided by 2 and a result is stored in the first counter; foregoing steps are performed repeatedly,
    wherein a commutating point is obtained when a value counted by the second counter reaches the value stored in the first counter; similarly, another commutating point is obtained when the value counted by the first counter reaches the value stored in the second counter.

2. The sensorless driving method according to claim 1, wherein the inhibition mechanism for inhibiting electronic noises caused by transistor switching is a soft-switch method for reducing noises by controlling the brushless DC motor through pulse width modulation (PWM), wherein the soft-switch method is to reduce a PWM duty cycle within an electrical angle $\Delta\theta$ before and after the commutating point, so as to reduce various routing voltages of the brushless DC motor.

3. The sensorless driving method according to claim 2, wherein the soft-switch method for reducing noises is to reduce the PWM duty cycle to or below 20%.

4. The sensorless driving method according to claim 2, wherein according to the soft-switch method for reducing noises, a first register and a second register are used for detecting whether the electrical angle is within $\Delta\theta$ before and after the commutating point, wherein the first register is used for recording a position of the electrical angle $\Delta\theta$ before the commutating point, and the second register is used for recording the position of the electrical angle $\Delta\theta$ after the commutating point, wherein
    when the second counter starts to count, a content of the first register is the value stored in the first counter minus the result of the stored value divided by 30, that is, the value stored in the first counter is a position value of the electrical angle $\Delta\theta$ before the commutating point, and a content of the second register is the value stored in the first counter plus the result of the stored value divided by 30, that is, the value stored in the second counter is the position value of the electrical angle $\Delta\theta$ after the commutating point; while when the first counter starts to count, the contents of the first and the second registers are calculated with the value stored in the second counter.

5. The sensorless driving method according to claim 2, wherein according to the soft-switch method for reducing noise, and a first register and a second register are used for detecting whether the electrical angle is within $\Delta\theta$ before and after the commutating point and whether the electrical angle is within $\Delta\theta$ before and after the commutating point is detected by comparing values counted by the first counter and the second counter and values stored in the registers; the PWM duty cycle is reduced if the value counted by the first counter or the second reaches the value in the first register, and the original PWM duty cycle is restored when the value counted by the counter reaches the value in the second register.

* * * * *